(12) United States Patent
Wellbrock et al.

(10) Patent No.: US 7,974,533 B2
(45) Date of Patent: Jul. 5, 2011

(54) LONG REACH OPTICAL NETWORK

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1051 days.

(21) Appl. No.: 11/611,008

(22) Filed: Dec. 14, 2006

(65) Prior Publication Data
US 2008/0145051 A1 Jun. 19, 2008

(51) Int. Cl.
*H04B 10/20* (2006.01)
*H04J 14/00* (2006.01)
*H04J 14/02* (2006.01)

(52) U.S. Cl. .............. 398/82; 398/58; 398/68; 398/72

(58) Field of Classification Search .............. 398/3, 6, 398/7, 33, 34, 58, 59, 66–68, 71, 72, 82, 398/83, 85, 175, 176, 177
See application file for complete search history.

(56) References Cited

U.S. PATENT DOCUMENTS

| | | | |
|---|---|---|---|
| 6,333,798 B1 * | 12/2001 | Allan et al. | 398/9 |
| 6,587,239 B1 * | 7/2003 | Hung | 398/79 |
| 6,724,994 B1 * | 4/2004 | Collings et al. | 398/75 |
| 7,450,847 B1 * | 11/2008 | Frigo et al. | 398/59 |
| 2007/0086332 A1 * | 4/2007 | Way et al. | 370/223 |
| 2007/0147841 A1 * | 6/2007 | Takita et al. | 398/83 |
| 2008/0013950 A1 * | 1/2008 | Boudreault et al. | 398/59 |

* cited by examiner

*Primary Examiner* — Dalzid Singh

(57) ABSTRACT

An optical network is provided including a first optical network section operatively coupled to a carrier facility configured to transmit traffic onto channels in the first optical network section. A second optical network section may be operatively coupled to the first optical network section at a first node. Additionally, the second optical network section may be operatively coupled to a customer location at a second node. The first and second nodes may include tunable filters for passing traffic via at least one channel from the first optical network section to the second optical network section.

17 Claims, 3 Drawing Sheets

LONG REACH OPTICAL NETWORK

BACKGROUND

With the explosion in communication via the Internet in recent years, there has been a corresponding increase in demand for high bandwidth networks, such as networks incorporating optical fibers. One type of network architecture includes several different classes or types of networks coupled together to enable users to communicate with each other. Enterprise or access level networks provide bandwidth to individual customers and typically connect to larger metropolitan level networks. The metropolitan level networks, in turn, typically connect to even larger long haul or backbone level networks. In one type of network topology, each network is configured as a ring, with each ring having a number of nodes configured to add or drop traffic to or from the parent network.

In conventional metropolitan level ring networks (often referred to as metropolitan area networks or MANs), carrier level switching facilities receive traffic from the long haul network and distribute the traffic among a number of carrier aggregation facilities using Synchronous Optical Network/Synchronous Digital Hierarchy (SONET/SDH) frames delivered via time domain multiplexing (TDM) technologies. Each aggregation facility connects to an access level network for delivering the SONET/SDH frames to customer premises.

Unfortunately, TDM aggregation and processing equipment is costly and difficult to maintain. Each aggregation point on a traditional SONET over TDM network requires significant infrastructure development. Additionally, switching systems associated with SONET frames delivered via TDM require costly traffic grooming and other equipment at the enterprise or local network level. Lastly, the optical-to-digital and digital-to-optical conversions required to process TDM signals introduce additional cost and potential errors at the aggregation facilities and customer premises locations.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION OF PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods described herein provide cost-effective deployment of metropolitan to enterprise access level optical networks. In one implementation, a first set of tunable optical filters may be used to direct ranges or bands of long reach wavelength division multiplexing (WDM) channels through a metropolitan network to a number of enterprise level access networks. A second set of tunable optical filters located on each access network may be used to direct individual WDM channels to customer premises locations.

Figure 1:
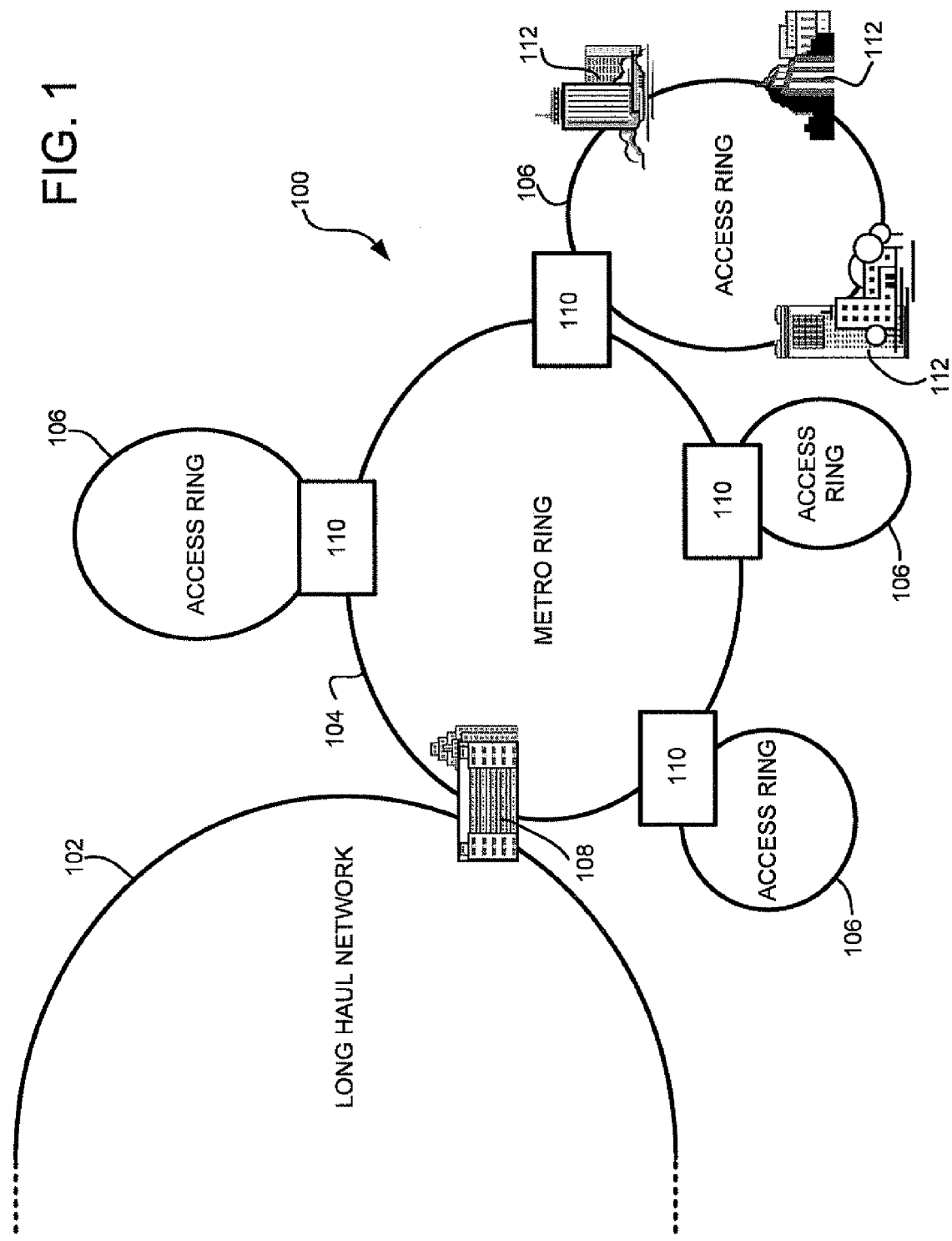
FIG. 1 is a block diagram illustrating an exemplary communications system 100 in which systems and methods described herein may be implemented.

FIG. 1 is a block diagram illustrating an exemplary communications system 100 in which systems and methods described herein may be implemented. Communications system 100 may include multiple networks including a long haul network 102, a metropolitan ("metro") ring network 104, and a number of enterprise access ("access") rings 106. Metro ring 104 may be coupled to long haul network 102 at a carrier switch facility 108. Access rings 106 may be coupled to metro ring 104 at a number of nodes 110. A number of customer premise locations 112 may be coupled to each access ring 106.

Traffic to and from high bandwidth long haul network 102 may be switched on to and off of metro ring 104 by carrier switch 108. Traffic on metro ring 104 may be further directed to access rings 106 at each node 110. The traffic may then be routed or delivered from the access rings 106 to respective customer premises locations 112. As will be described in additional detail below, systems described herein may enable efficient and low cost delivery of optical signals from carrier switch 108 to customer premises locations 112 without requiring expensive aggregation or optical to digital conversions.

Figure 2:
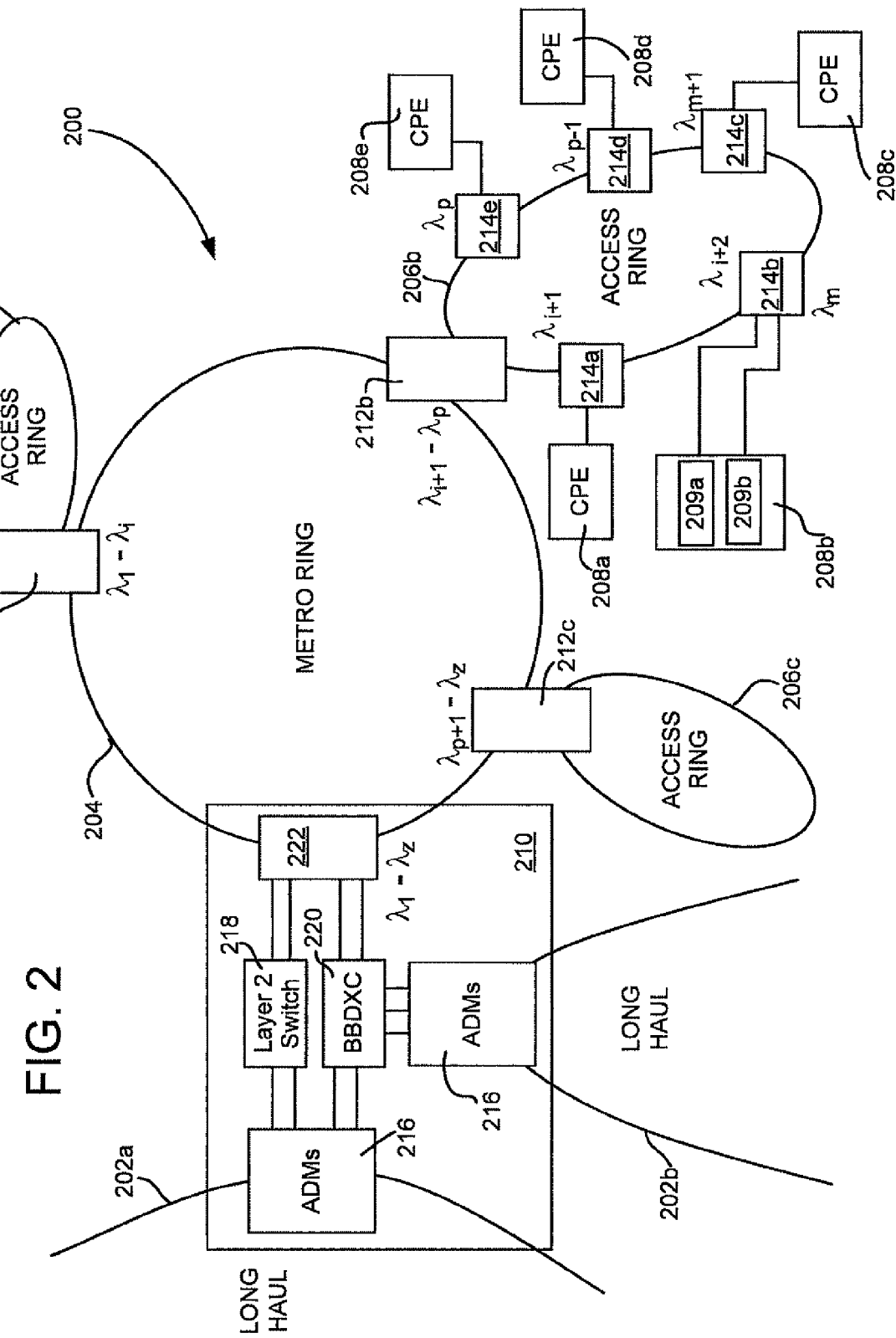
FIG. 2 is another block diagram illustrating an exemplary communications system 200 in which systems and methods described herein may be implemented.

FIG. 2 is a block diagram illustrating one exemplary communications system 200 implementation of a metro ring and access ring configuration. System 200 may include a metro ring 204, a number of access rings 206a, 206b, and 206c, and a number of customer premises locations 208a, 208b, 208c, 208d, and 208e. As llustrated, metro ring 204 may be coupled to long haul networks 202a and 202b by a carrier switching facility 210. Additionally, access rings 206a-206c may be coupled to metro ring 204 by a number of banded optical filters 212a, 212b, and 212c, respectively. Customer premises locations 208a-208e may be coupled to access rings 206a-206c by a number of channelized optical filters 214a, 214b, 214c, 214d, and 214e.

In an exemplary implementation, switching facility 210 may provide traffic to and from long haul network 202 to metro ring 204 using wavelength division multiplexing (WDM) technologies. As is known, WDM is a more recent optical transmission technology that enables a number of discrete optical wavelengths to be multiplexed or simultaneously transmitted on a single optical fiber. A variant of WDM known as dense WDM or DWDM enables between 80 and 100 or even more discrete optical channels to travel within a single fiber.

In one implementation, carrier switching facility 210 may include a number of add/drop multiplexers 216 (ADMs) configured to connect switching equipment to long haul networks 202a and 202b or, alternatively, to adjacent metro rings, thereby facilitating the transfer of traffic between the networks. In one implementation, long haul networks 202a and 202b and/or adjacent metro rings may include OC-192 four fiber bi-directional line switching rings (BLSR/4F) configured to cover distances as long as 600 kilometers (km). As is known, OC-192 supports speeds of approximately 10 gigabits per second. Additionally, a BLSF/4F configuration includes a ring topology in which two fibers are provided as working fibers and two fibers are provided as protection fibers. In one embodiment, ADMs 216 may divide received OC-192 signals into four OC-48 signals each capable of speeds up to 2.5 gigabits per second.

In one exemplary embodiment, carrier switching facility 210 may also include a layer 2 IP switch 218 as well as a broadband digital cross connect (BBDXC) 220 configured to perform multiservice switching between long haul network 202a or 202b and metro ring 204. Carrier switching facility 210 may include an optical transmitter 222 capable of multiplexing and transmitting a number of DWDM channels covering wavelengths $\lambda_1$-$\lambda_z$ over distances of at least about 80 km, where z is an integer representing a last wavelength channel. Unlike conventional traffic aggregation and regeneration facilities required by SONET/SDH via TDM metropolitan networks, traffic forwarded by optical transmitter 222 may be capable of reaching customer premises locations 208a-208e entirely within the optical domain. In this manner, the aggregation facilities may be bypassed, resulting in significant cost and maintenance savings.

Banded optical filters 212a, 212b, and 212c may include tunable passive filters configured to direct only predetermined DWDM channels to the associated access rings 206a, 206b, and 206c. For example, as illustrated in FIG. 2, banded optical filter 212a may be configured to pass channels associated with wavelengths $\lambda_1$-$\lambda_i$ to access ring 206a, filter 212b may be configured to pass channels associated with wavelengths $\lambda_{i+1}$-$\lambda_p$ to access ring 206b, and filter 212c may be configured to pass channels associated with wavelengths $\lambda_{p+1}$-$\lambda_z$ to access ring 206c. As described above with respect to variable z, variables i and p are likewise integers representing selected wavelength channels along metro ring 204. It should be noted that the number of access rings 206 shown is merely exemplary and that any suitable number of access rings may be provided, depending on the bandwidth requirements for associated customers premises locations 208a-208e and the number of discrete channels transmitted on metro ring 204 by optical transmitter 222.

Unlike conventional SONET/SDH via TDM metro rings, by configuring metro ring 204 to carry DWDM channels, costly signal aggregation and TDM switching facilities may be replaced with inexpensive passive filters 212a-212c.

Channelized optical filters 214a-214e may include tunable passive filters configured to pass only specific channels from access rings 206a-206c to each respective customer premises location 208a-208e. For example, one of filters 214 may be configured to pass a single channel to a single customer premises location 208. Alternatively, a filter 214 may be configured to pass multiple discrete channels to multiple customer premises 208, ensuring that each customer premises 208 receives a dedicated channel.

As illustrated in FIG. 2, optical filter 214a may be configured to pass channel associated with a wavelength $\lambda_{i+1}$ to customer premises location 208a, optical filter 214b may be configured to pass a channel associated with a wavelength $\lambda_{i+2}$ to a first access point 209a at customer premises location 208b and a channel associated with a wavelength $\lambda_m$ to a second access point 209b at customer premises location 208b, optical filter 214c may be configured to pass a channel associated with a wavelength $\lambda_{m+1}$ to customer premises location 208c, optical filter 214d may be configured to pass a channel associated with a wavelength $\lambda_{p-1}$ to customer premises location 208d, and optical filter 214e may be configured to pass a channel associated with a wavelength $\lambda_p$ to customer premises location 208e. Variable m is an integer representing a selected wavelength channel along access ring 206b.

Figure 3:
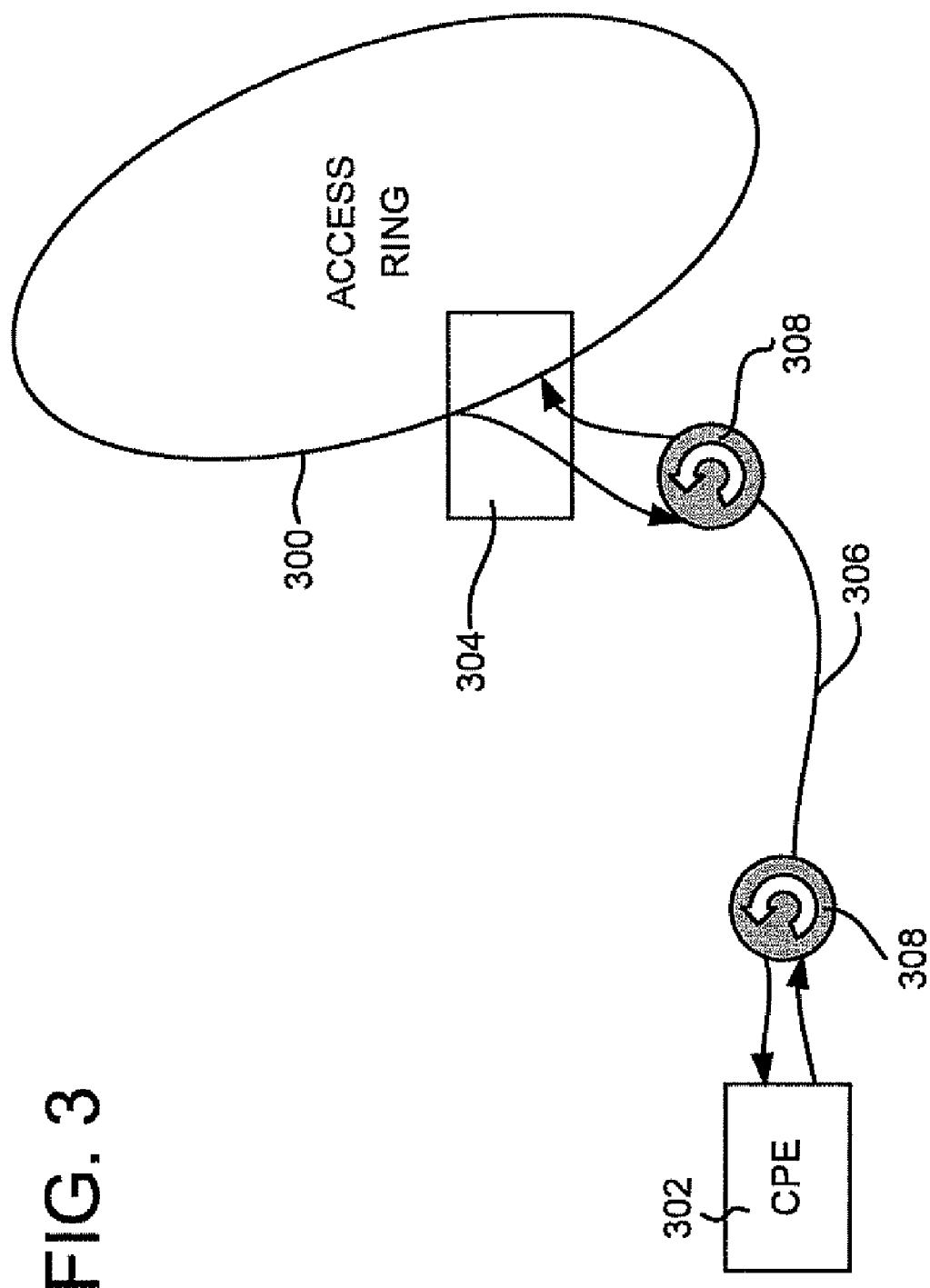
FIG. 3 is a block diagram illustrating one exemplary configuration of a customer premises connection to an access network as depicted in FIG. 2.

FIG. 3 is a block diagram illustrating one exemplary configuration of an access ring 300 and a customer premises location 302. In a manner similar to that described above, customer premises location 302 may be coupled to access ring 300 by a channelized filter 304 configured to pass a predetermined bandwidth from access ring 300 to a feeder fiber 306 associated with customer premises location 302.

A customer premises location initially configured to support SONET/SDH via TDM (e.g., customer premises location 302) may be served by a single fiber 306 coupled to access ring 300. This fiber may be referred to as a "feeder fiber". In a typical configuration, feeder fiber 306 may be incapable of supporting bidirectional traffic of DWDM and WDM channels. In one embodiment described herein, a pair of circulators 308 may be coupled on either ends of feeder fiber 306 to facilitate bidirectional support and enable DWDM traffic to be transmitted both to and from customer premises location 302.

By enabling an all-optical distribution of traffic from a carrier switching facility to each customer premises location, systems consistent with principles described herein may substantially increase the efficiency of network operations while simultaneously significantly reducing costs associated with delivering high bandwidth traffic to access networks and eventually individual customers.

CONCLUSION

Implementations described herein provide for all-optical delivery of network traffic through a metropolitan level network, and an access level network to enterprise or customer level locations. In one implementation, tunable filters may be used to deliver targeted wavelengths from the metropolitan network to each associated access network. Additional filters may be used to pass specific traffic channels from the access networks to customers associated with the access networks.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

It will be apparent to one of ordinary skill in the art that the features described above, may be implemented in many different forms of hardware, software, or firmware in the implementations illustrated in the figures. The actual hardware or control software used to implement the described features is not limiting of the invention. Thus, the operation and behavior of these features were described without reference to specific hardware or control software—it being understood that one of ordinary skill in the art would be able to design hardware and software to implement the features based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. An optical network, comprising:
    a first optical network section operatively coupled to a carrier facility configured to transmit traffic onto channels in the first optical network section;
    a second optical network section operatively coupled to the first optical network section at a first node, the second optical network section operatively coupled to a first customer location at a second node and a second customer location at a third node; and a third optical network section operatively coupled to the first optical network section at a fourth node, wherein the first node comprises a first banded optical filter for passing traffic having a first wavelength range from the first optical network section to the second optical network section, wherein the fourth node comprises a second banded optical filter for passing traffic having a second wavelength range from the first optical network section to the third optical network section, wherein the second node comprises a first tunable filter for passing traffic on a first channel in the first wavelength range from the second optical network section to the first customer location, and wherein the third node comprises a second tunable filter for passing traffic on a second channel in the first wavelength range from the second optical network section to the second customer location.

2. The optical network of claim 1, wherein the first optical network section and the second optical network section are configured to carry traffic on channels created by wavelength division multiplexing (WDM).

3. The optical network of claim 2, wherein the first optical network section and the second optical network section are formed in a ring topology.

4. The optical network of claim 3, wherein the first optical network section comprises a metropolitan ring network.

5. The optical network of claim 4, wherein the metropolitan ring network is configured to transmit traffic over distances of at least about 80 kilometers.

6. The optical network of claim 3, wherein the second optical network section comprises an access level ring network.

7. The optical network of claim 1, wherein the first wavelength range is different than the second wavelength range.

8. The optical network of claim 1, wherein the first and second tunable filters comprise channelized optical filters configured to pass traffic via predetermined channels from the second optical network section to the first and second customer locations, respectively.

9. The optical network of claim 1, wherein the first optical network section and the second optical network section are configured to carry traffic on channels created by dense wavelength division multiplexing (DWDM).

10. The optical network of claim 1, wherein the carrier facility includes an optical transmitter configured to output traffic via a number of DWDM channels, each channel having a predetermined wavelength.

11. The optical network of claim 1, wherein the carrier facility is configured to be operatively coupled to a long haul optical backbone network.

12. An optical network, comprising:
a first optical network section operatively coupled to a carrier facility, the carrier facility configured to transmit traffic onto channels in the first optical network section; and a second optical network section operatively coupled to the first optical network section at a first node, the second optical network section operatively coupled to a customer location at a second node, wherein the first and second nodes comprise tunable filters for passing traffic on at least one channel from the first optical network section to the second optical network section, wherein the carrier facility comprises:
an add/drop multiplexer operatively coupled to a long haul network;
a layer 2 switch operatively coupled to the add/drop multiplexer; and
an optical transmitter operatively coupled to the layer 2 switch, the optical transmitter configured to output traffic via a number of DWDM channels based on an output of the layer 2 switch, each channel having a predetermined wavelength.

13. The optical network of claim 1, further comprising:
a single feeder fiber operatively connecting the customer location and the second node;
wherein the second node includes a first circulator for providing bidirectional traffic to and from the feeder fiber.

14. The optical network of claim 13,
wherein the customer location includes a second circulator for providing bidirectional traffic to and from the feeder fiber in a direction opposite to that of first circulator.

15. A network, comprising:
a metro ring network configured to receive traffic in wavelength division multiplexing (WDM) channels from a carrier facility;
a first access ring network operatively coupled to the metro ring network by a first banded optical filter,
wherein the first banded optical filter is configured to pass traffic having a first wavelength range from the metro ring network to the first access ring network;
a first customer premises location operatively coupled to the first access ring network by a first tunable filter,
wherein the first tunable filter is configured to pass traffic on a first channel in the first wavelength range from the first access ring network to the first customer premises location; and
a second access ring network operatively coupled to the metro ring network by a second banded optical filter,
wherein the second banded optical filter is configured to pass traffic having a second wavelength range from the metro ring network to the second access ring network.

16. The network of claim 15, wherein the metro ring network is configured to support between about 80 and 100 WDM channels.

17. The network of claim 15, wherein the carrier facility includes an optical transmitter configured to transmit traffic via the WDM channels onto the metro ring network.

* * * * *